Patented Dec. 26, 1950

2,535,416

UNITED STATES PATENT OFFICE 2,535,416

POLYAZO DYESTUFFS

Peter Hindermann, Basel, and Werner Bossard and Adolf Krebser, Riehen, Switzerland, assignors to J. R. Geigy A. G., Basel, Switzerland, a Swiss firm No Drawing. Application April 28, 1949, Serial No. 90,272. In Switzerland November 9, 1945

6 Claims. (Cl. 260—166)

This patent application is a continuation-in-part application of our presently abandoned copending patent application Ser. No. 708,812, filed on November 8, 1946.

We have found that valuable tetrakisazo dyestuffs are obtained on coupling disazo dyestuffs of the following general formula

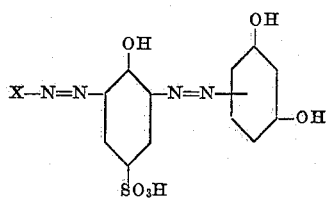

wherein X means the radical of an unsulfonated 1.3-diamino-benzene coupling component with diazotised aminoazo compounds of the general formula

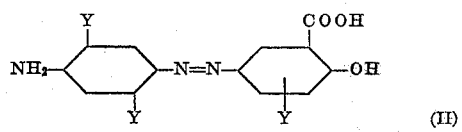

wherein each Y means a member selected from the group consisting of H and $CH_3$ and by treating the resultant tetrakisazo dyestuffs on the fibre with copper-yielding agents.

The disazo dyestuffs of the Formula I may be prepared in the following way: 1 mol of 1-hydroxy-2.6-diaminobenzene-4-sulfonic acid or 1-chloro-2.6-diaminobenzene-4-sulfonic acid is tetrazotised and, if required, the 1-chlorine atom replaced by an —OH by treatment of the tetrazonium compound with sodium acetate solution yielding 1-hydroxy-2.6-tetrazobenzene-4-sulfonic acid and combined with 1 mol of an unsulfonated 1.3-diaminobenzene coupling component of the formula X—H, wherein X means the radical of the coupling component, this intermediate product being further coupled with 1 mol of resorcinol, thus yielding the disazo dyestuff.

As first coupling component X—H used for the production of the disazo dyestuffs of the above Formula I use may be made inter alia of: 1.3-diaminobenzene, 1.3-diamino-4-methyl-benzene, 1.3-diamino-4-chloro-benzene.

As aminoazo compounds corresponding to the above Formula II may be used for instance the following monoazo dyestuffs: p-aminobenzene-azosalicylic acid, p-aminobenzene-azo-o-cresotic acid, p-aminobenzene-azo-m-cresotic acid, 5-amino-2-hydroxybenzene-1-carboxylic acid→m-toluidine, 5-amino-2-hydroxybenzene-1-carboxylic acid→p-xylidine and so on.

The new dyestuffs have a good affinity for natural and regenerated cellulosic fibres which are dyed in brown shades. By an after-treatment of the new dyestuffs on the fibre with copper-yielding agents brown dyeings of good light- and acid-fastness properties and of good fastness properties in the moist state are produced. They give pure white discharges on treatment with hydrosulfite pastes containing agents which liberate cyan ions, as described in U. S. Pat. No. 2,446,992. The coppering can be effected in a known manner, for instance, by means of copper sulfate in a neutral or slightly acetic acid bath. If desired, copper compounds stable to alkalis can also be used, that is to say compounds of the kind obtainable when copper salts are interacted with sodium tartrate in a soda-alkaline aqueous solution.

The following examples may illustrate, but not limit the present invention. In these examples, parts by weight bear the same relationship to parts by volume that grams bear to cubic centimeters.

Example 1

20.4 parts of 1-hydroxy-2.6-diaminobenzene-4-sulfonic acid are tetrazotised with 13.8 parts of sodium nitrite in a hydrochloric acid solution, the mineral acid present in excess being subsequently neutralised by means of sodium acetate, whereupon the mixture is combined in the presence of an excess of sodium acetate with a neutral solution of 10.8 parts of 1.3-diaminobenzene. The intermediate product, which is rapidly formed, is stirred for 2 hours and then further coupled by allowing the intermediate compound to run slowly into a solution of 11 parts of resorcinol, 40 parts of sodium carbonate and 600 parts of water, whereby the disazo dyestuff is instantaneously formed. Stirring is continued for a few more hours. Then it is salted out, filtered and the pressed cake washed with brine until no more resorcinol can be detected. The disazo dyestuff is then further coupled in a soda-alkaline medium with the diazonium compound obtainable from 25.7 parts of p-aminobenzene-azosalicylic acid. After stirring for several hours the polyazo dyestuff is isolated with sodium chloride, filtered and dried. It corresponds to the formula

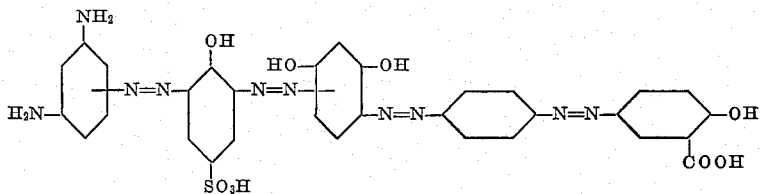

It is a dark powder dissolving in water with a red-brown coloration and in concentrated sulfuric acid with a dark blue coloration and dyeing cellulosic fibres from a neutral Glauber's salt bath in brown shades which, on after-treatment with copper sulfate, are converted into a reddish-brown shade with very good fastness properties to light and in the moist state.

If, instead of the diazo compound from 25.7 parts of p-aminobenzene-azo-salicylic acid, diazo compounds from 27.1 parts of p-aminobenzene-azo-o-cresotic acid, p-aminobenzene-azo-m-cresotic acid, 27.1 parts of 4-amino-3-methyl-4'-hydroxy-3'-carboxy-1.1'-azobenzene, 27.1 parts of aminoazo dyestuff 4-amino-1-hydroxybenzene-2-carboxylic acid→1-amino-3-methylbenzene or 28.5 parts of the aminoazo dyestuff 4-amino-1-hydroxybenzene-2-carboxylic acid→1-amino-2.5-dimethylbenzene, are used, dyestuffs having similar properties will be obtained. With p-aminobenzene-azo-o-cresotic acid a dyestuff corresponding to the following formula is obtained:

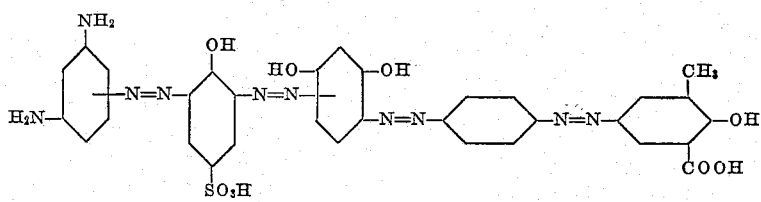

*Example 2*

22.25 parts of 1-chloro-2.6-diaminobenzene-4-sulfonic acid are tetrazotised in a hydrochloric acid solution with 13.8 parts of sodium nitrite, whereupon the mineral acid present in excess is neutralised with sodium acetate thereby hydrolysing the chlorine atom in the 1-position. Then the mixture is combined in the presence of an excess of sodium acetate with an aqueous solution of 12.2 parts of 1.3-diamino-4-methyl benzene, thus giving the intermediate product. After several hours further coupling is carried out by allowing a solution of 11 parts of resorcinol and 40 parts of sodium carbonate in 400 parts of water to run thereinto. The disazo dyestuff thus produced is isolated in the manner described in Example 1 and further coupled with the diazonium compound of 25.7 parts of p-aminobenzene-azo-salicylic acid in soda-alkaline solution.

The new dyestuff is precipitated completely by sodium chloride, isolated and dried. The dyestuff, which corresponds to the formula

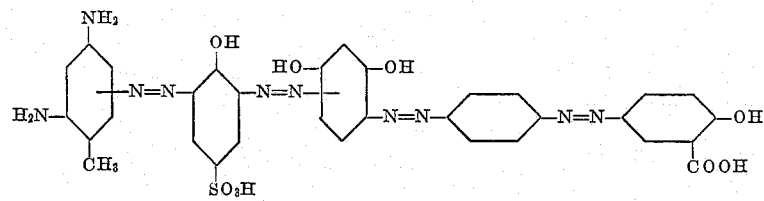

forms a dark powder which is soluble in water with the formation of a brown solution and in concentrated sulfuric acid with a dark blue coloration. Cellulosic fibres are dyed by this dyestuff in brown shades. On after-coppering, the fastness properties to light, to acid and in the moist state are improved.

Brown dyestuffs with similar properties are obtained, on using in the above example instead of 12.2 parts of 1.3-diamino-4-methyl-benzene as first coupling component, 10.8 parts of 1.3-diamino-benzene or 14.25 parts of 1.3-diamino-4-chlorobenzene or, as diazo component one of the diazomonoazo dyestuffs mentioned in Example 1.

*Example 3*

20.4 parts of 1-hydroxy-2.6-diaminobenzene-4-sulfonic acid are tetrazotised and combined, as described in Example 1, first with 14.25 parts of 1.3-diamino-4-chloro-benzene, thus giving the intermediate product, and then with 11 parts of resorcinol, whereby the disazo dyestuff is obtained. After having precipitated out with hydrochloric acid and washed the said disazo dyestuff with brine until it is free from resorcinol, it is combined with a soda-alkaline solution with the diazoamino-azo compound obtainable from 27.1 parts of the monoazo dyestuff 5-amino-2-hydroxybenzene-1-carboxylic acid→1-amino-3-methylbenzene. The next morning the tetrakisazo dyestuff thus formed is salted out, filtered and dried. It corresponds to the formula

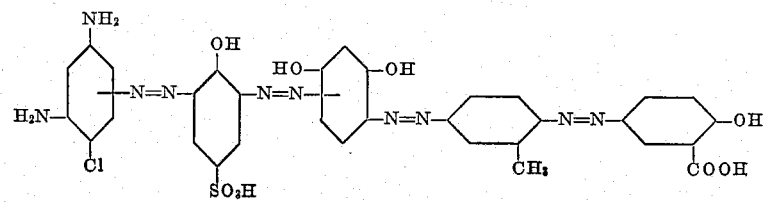

It constitutes a dark powder which, when dissolved in water, gives a brown solution and is soluble in concentrated sulfuric acid with a blue coloration. Cotton and fibres from regenerated cellulose are dyed in reddish-brown shades. By an after-treatment with copper sulfate excellent fastness properties in the moist state and to light and acid are obtained.

Dyestuffs having similar properties can also be obtained by replacing the aminomonoazo dyestuff 5-amino-2-hydroxybenzene-1-carboxylic acid→1-amino-3-methylbenzene by another of the diazotised aminomonoazo compounds mentioned in Example 1 as end coupling component.

What we claim is:

1. The tetrakisazo dyestuff which, in the free state, corresponds to the general formula

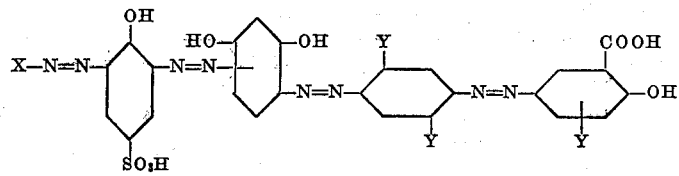

wherein X stands for a radical of an unsulfonated 1.3-diaminobenzene coupling component and each Y stands for a member of the group consisting of H and $CH_3$.

2. The tetrakisazo dyestuff which, in the free state, corresponds to the general formula

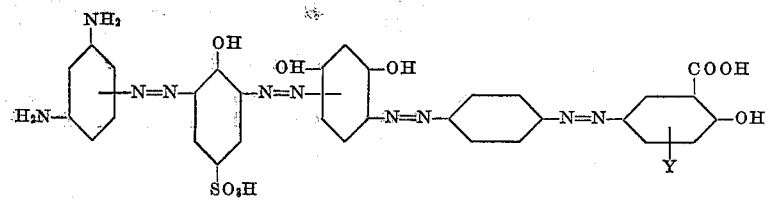

wherein Y stands for a member of the group consisting of H and $CH_3$.

3. The tetrakisazo dyestuff which, in the free state, corresponds to the formula

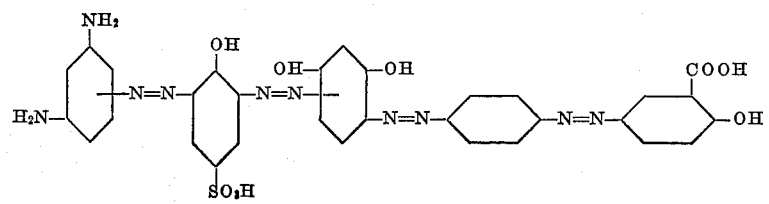

4. The tetrakisazo dyestuff which, in the free state, corresponds to the formula

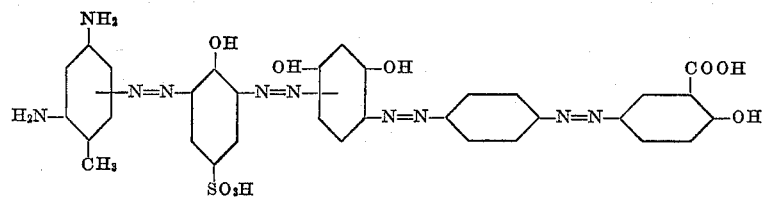

5. The tetrakisazo dyestuff which, in the free state, corresponds to the formula

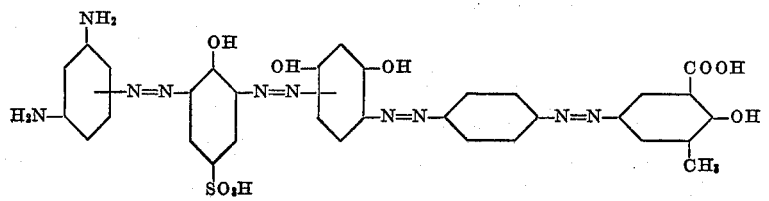

6. The tetrakisazo dyestuff which, in the free state, corresponds to the formula
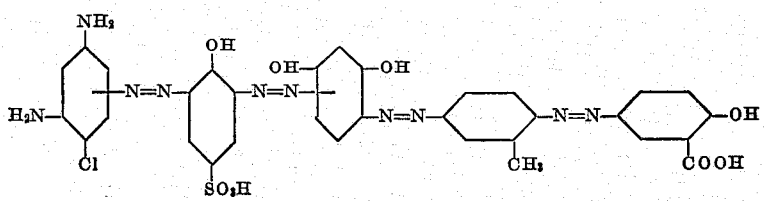
PETER HINDERMANN.
WERNER BOSSARD.
ADOLF KREBSER.
REFERENCES CITED
The following references are of record in the file of this patent:
UNITED STATES PATENTS
| Number | Name | Date |
| --- | --- | --- |
| 2,447,222 | Wehrli et al. | Aug. 17, 1948 |
| 2,454,683 | Wehrli et al. | Nov. 23, 1948 |
FOREIGN PATENTS
| Number | Country | Date |
| --- | --- | --- |
| 518,509 | Great Britain | Feb. 28, 1940 |